United States Patent
Misra et al.

(10) Patent No.: US 11,399,312 B2
(45) Date of Patent: Jul. 26, 2022

(54) STORAGE AND RETENTION INTELLIGENCE IN MOBILE NETWORKS

(71) Applicant: International Business Machines Corporation, Armonk, NY (US)

(72) Inventors: Dharmendra Misra, Maharashtra (IN); Seetharaman Sankara Ramasubramanian, Lower Hutt (NZ); Abhinav Aggarwal, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 16/539,739

(22) Filed: Aug. 13, 2019

(65) Prior Publication Data

US 2021/0051521 A1    Feb. 18, 2021

(51) Int. Cl.
| | |
|---|---|
| *H04W 28/14* | (2009.01) |
| *H04W 8/00* | (2009.01) |
| *G06N 20/00* | (2019.01) |

(52) U.S. Cl.
CPC ............ *H04W 28/14* (2013.01); *G06N 20/00* (2019.01); *H04W 8/00* (2013.01)

(58) Field of Classification Search
CPC ........ H04W 28/14; H04W 8/00; G06N 20/00; H04L 67/10; H04L 67/1076; H04L 41/042; H04L 41/0893
See application file for complete search history.

(56) References Cited

U.S. PATENT DOCUMENTS

| | | | |
|---|---|---|---|
| 6,453,346 B1 | 9/2002 | Garg et al. | |
| 7,046,689 B2 | 5/2006 | Burns et al. | |
| 8,539,040 B2 | 9/2013 | Luna et al. | |
| 8,676,920 B2 | 3/2014 | Bai et al. | |
| 8,977,672 B2 | 3/2015 | Karandikar | |

(Continued)

FOREIGN PATENT DOCUMENTS

| | | |
|---|---|---|
| CN | 103744790 B | 5/2017 |
| WO | 03001327 A2 | 1/2003 |
| WO | 2018170253 A1 | 9/2018 |

*Primary Examiner* — Hoang-Chuong Q Vu
(74) *Attorney, Agent, or Firm* — Garg Law Firm, PLLC; Rakesh Garg; Christopher Pignato

(57) ABSTRACT

In an embodiment, a computer implemented method and architecture for managing data in mobile communication network which includes core and access components. This embodiment performs specialized data handling through processing nodes referred as Storage Retention and Intelligent Function (SRIF) nodes, an evaluation operation on control plane and user plane data received from the mobile communication network. This action determines whether any portion of the data needs intelligent processing and applies knowledge extraction algorithm for build-up retention or policy decision. As responsive to the evaluation operation, the SRIF nodes apply decisions on data or enable network nodes to apply data processing rules. The architecture of SRIF is hierarchical comprising end node as serving node, middle node as load balancing node providing flexibility, and central node as the brain. The central node performs data processing based on pre-defined rules or algorithms developed by analyzing data or by applying Machine learning.

14 Claims, 13 Drawing Sheets

(56) References Cited

U.S. PATENT DOCUMENTS

| | | | |
|---|---|---|---|
| 10,291,748 B1* | 5/2019 | Dods | H04L 43/00 |
| 10,453,165 B1* | 10/2019 | Kostov | G06T 1/20 |
| 10,567,235 B1* | 2/2020 | Shah | H04L 41/16 |
| 10,735,469 B1* | 8/2020 | Dods | H04L 43/028 |
| 10,979,461 B1* | 4/2021 | Cervantez | G06N 20/00 |
| 11,056,222 B1* | 7/2021 | Nambirajan | G16H 20/10 |
| 2002/0019658 A1 | 2/2002 | Munshi | |
| 2010/0192225 A1* | 7/2010 | Ma | H04L 63/0227 726/23 |
| 2012/0290795 A1 | 11/2012 | Dowlatkhah | |
| 2013/0128885 A1* | 5/2013 | Kardashov | H04L 45/7453 370/389 |
| 2015/0365193 A1* | 12/2015 | Connolly | H04L 41/0803 398/52 |
| 2016/0062689 A1 | 3/2016 | Cherubini et al. | |
| 2017/0005809 A1 | 1/2017 | Adam et al. | |
| 2017/0372230 A1* | 12/2017 | Kuromatsu | G06F 17/11 |
| 2018/0150548 A1* | 5/2018 | Shah | G06F 16/254 |
| 2018/0268293 A1* | 9/2018 | Noda | G06N 7/08 |
| 2019/0089725 A1* | 3/2019 | Anachi | G06N 20/00 |
| 2019/0147361 A1* | 5/2019 | Matsumoto | G06K 9/6262 706/12 |
| 2019/0228495 A1* | 7/2019 | Tremblay | G06T 1/0014 |
| 2019/0386913 A1* | 12/2019 | Wei | H04L 49/1515 |
| 2020/0013124 A1* | 1/2020 | Obee | G06Q 40/08 |
| 2020/0042903 A1* | 2/2020 | Moazzami | G06N 20/20 |
| 2020/0065706 A1* | 2/2020 | Kao | G06T 11/20 |
| 2020/0073891 A1* | 3/2020 | Fighel | G06F 16/906 |
| 2020/0104751 A1* | 4/2020 | Sesha | H04L 41/16 |
| 2020/0195564 A1* | 6/2020 | Huang | H04L 45/08 |
| 2020/0250571 A1* | 8/2020 | Almasan | G06N 5/04 |
| 2020/0366717 A1* | 11/2020 | Chau | H04L 63/0236 |
| 2020/0401945 A1* | 12/2020 | Xu | G06K 9/6232 |
| 2021/0140938 A1* | 5/2021 | Washio | G06N 99/00 |
| 2021/0342344 A1* | 11/2021 | Kowolenko | G06F 3/0482 |

\* cited by examiner

STORAGE AND RETENTION INTELLIGENCE IN MOBILE NETWORKS

TECHNICAL FIELD

The present invention relates generally to wireless communication, and more specifically to intelligent data management and processing in wireless communication networks.

BACKGROUND

As the number and types of wireless devices continues to grow, the demands being placed on the existing mobile network infrastructure are pushing networks to their limits. Because of this, network operators and service providers have been working to upgrade existing mobile networks to a new, next-generation network architecture. The improvements include technologies such as edge computing, higher radio frequencies, and virtualization that are expected to allow future networks to move more data at faster speeds than existing networks can offer. The upgrades are also expected to improve the network's scalability so that future networks can adapt to large bursts of data. Next-generation mobile applications are going beyond person-to-person communications to such things as large-scale machine-type communications and growing numbers of Internet of Things (IoT) devices that have to potential to cause very large data bursts in human use of mobile communications.

SUMMARY

The illustrative embodiments provide a method, system, approach and computer program product for managing data and extracting intelligence from data for future iterative use for a mobile communication network. In an embodiment, the method includes receiving, by an end node, access data from the mobile network; performing, by the end node, an evaluation operation on the mobile network data, including the user plane and control plane thereof where applicable, wherein the evaluation operation includes determining whether any portion of the mobile network data is unknown; responsive to the evaluation operation, transmitting, by the end node to a central node via a middle layer node, a transmission of the at least a portion of the access data, wherein the middle layer node comprises an interface that is accessible from the end node and from the central node for the transmission; and receiving, by the end node, a rule set determined by the central node to be applicable to the at least a portion of the network data (user plane and control plane) based on a data processing operation performed by the central node on the at least a portion of the access data.

An embodiment includes a computer implemented method for managing data in a heterogeneous telecom network that includes a core network and an access network. In an embodiment, the method includes receiving, by a central node from an end mode via a middle node, a transmission of at least a portion of access data transmitted to the end node from the access network, wherein the middle layer node comprises an interface that is accessible from the central node and from the end node for the transmission, and wherein the transmission of the at least a portion of access data is responsive to an evaluation operation on the access data by the end node including determining whether any portion of the access data is unknown; performing, by the central node, a data processing operation on the at least a portion of the access data to determine a rule set applicable to the at least a portion of the access data; and transmitting, by the central node to the end node, the rule set determined to be applicable to the at least a portion of the access data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
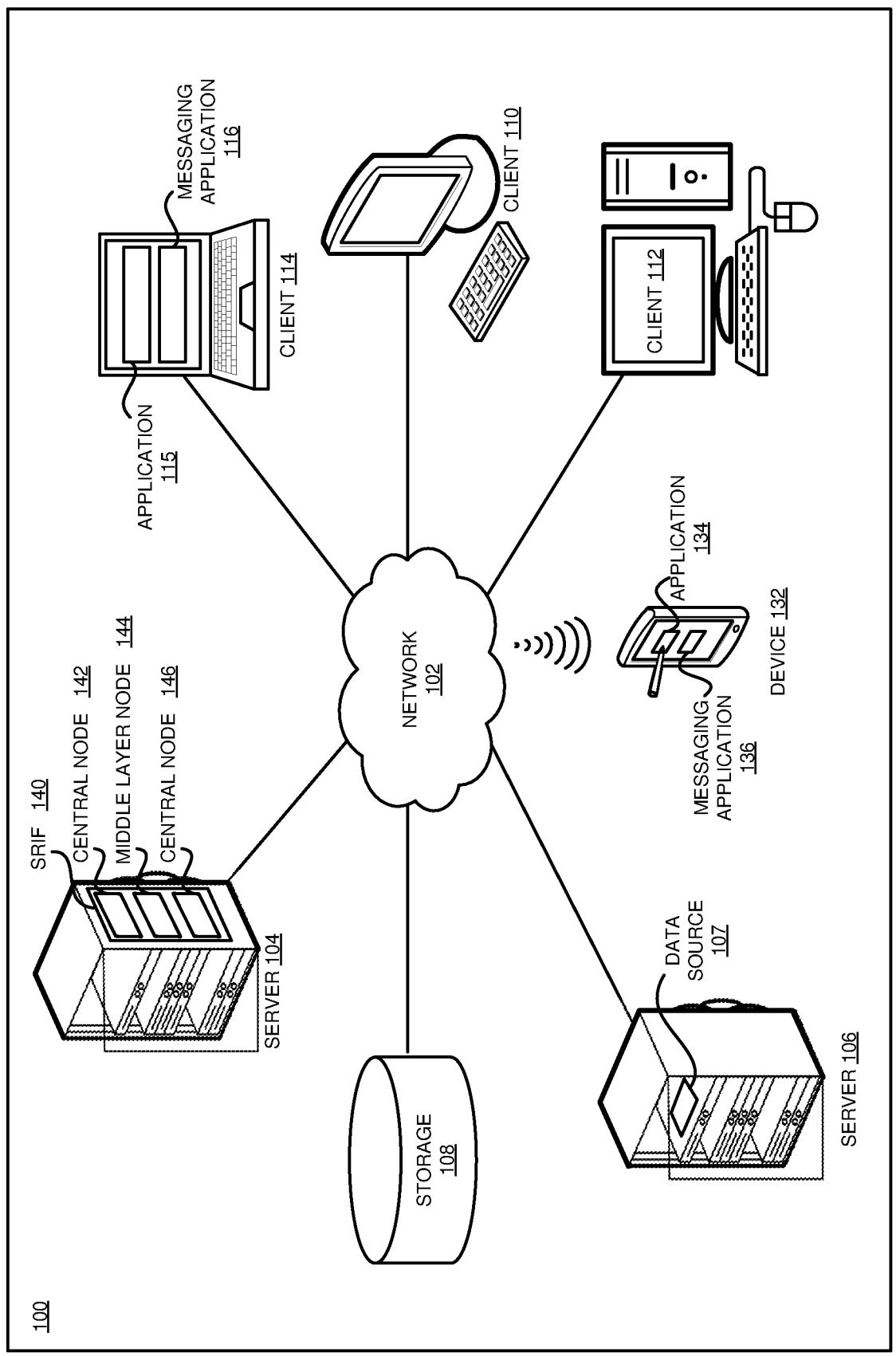
FIG. 1 depicts a block diagram of a network of data processing systems in which illustrative embodiments may be implemented.

Implementation of intelligent and smart data processing in telecom networks has become increasingly important to satisfy the knowledge needs of future-use scenarios for mobile networks. However, a problem in future networks is that the edge nodes will receive huge volumes of data, some of which will be critically important to retain. However, the virtual containers or physical infrastructure servicing these nodes do not have infinite data storage capacities, so they cannot retain all of the data they receive. Moreover, network nodes need to be smart and flexible enough to derive the intelligence in data and apply it without latency in order to satisfy the demands of future applications of mobile technologies, e.g. industrial automation. A data retention policy that does not discriminate between important and unimportant data will lose older, but more important data in favor of newer, but less-important data. On the other hand, implementing intelligent data retention policies at the edge and core nodes would greatly increase the data processing demands on the nodes, which would induce latency that would hinder the primary job of the nodes, which is to transfer data rather than running complex algorithm to extract intelligence from the data. As a result, there exists a need to improve data retention without overly taxing network functions.

The illustrative embodiments used to describe the invention generally address and solve the above-described problem of risks associated with loss in intelligence in high speed low latency data flows covering both user plane and control plane data in a telecom network due to the volume of unstructured and structured data that is continuously increasing as new data-intensive technologies and use-cases continue to be introduced to telecom networks, demonstrates an improvement in the quality of the results by preserving the intelligence and applying quick data handling decisions. For example, in some embodiments, an encapsulated Storage and Retention Intelligence function (SRIF) system is used to manage data in the network by offloading processor- and time-intensive processes from the network nodes to the SRIF, thereby freeing the network nodes to focus on core network node functions, for example data routing and forwarding functions.

An embodiment provides a computer implemented method for inspecting and transforming a machine learning model. Another embodiment provides a computer usable program product for inspecting and transforming a machine learning model, the computer usable program product comprising a computer-readable storage device, and program instructions stored on the storage device. Another embodiment provides A computer system comprising a processor, a computer-readable memory, and a computer-readable storage device, and program instructions stored on the storage device for execution by the processor via the memory.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile network devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
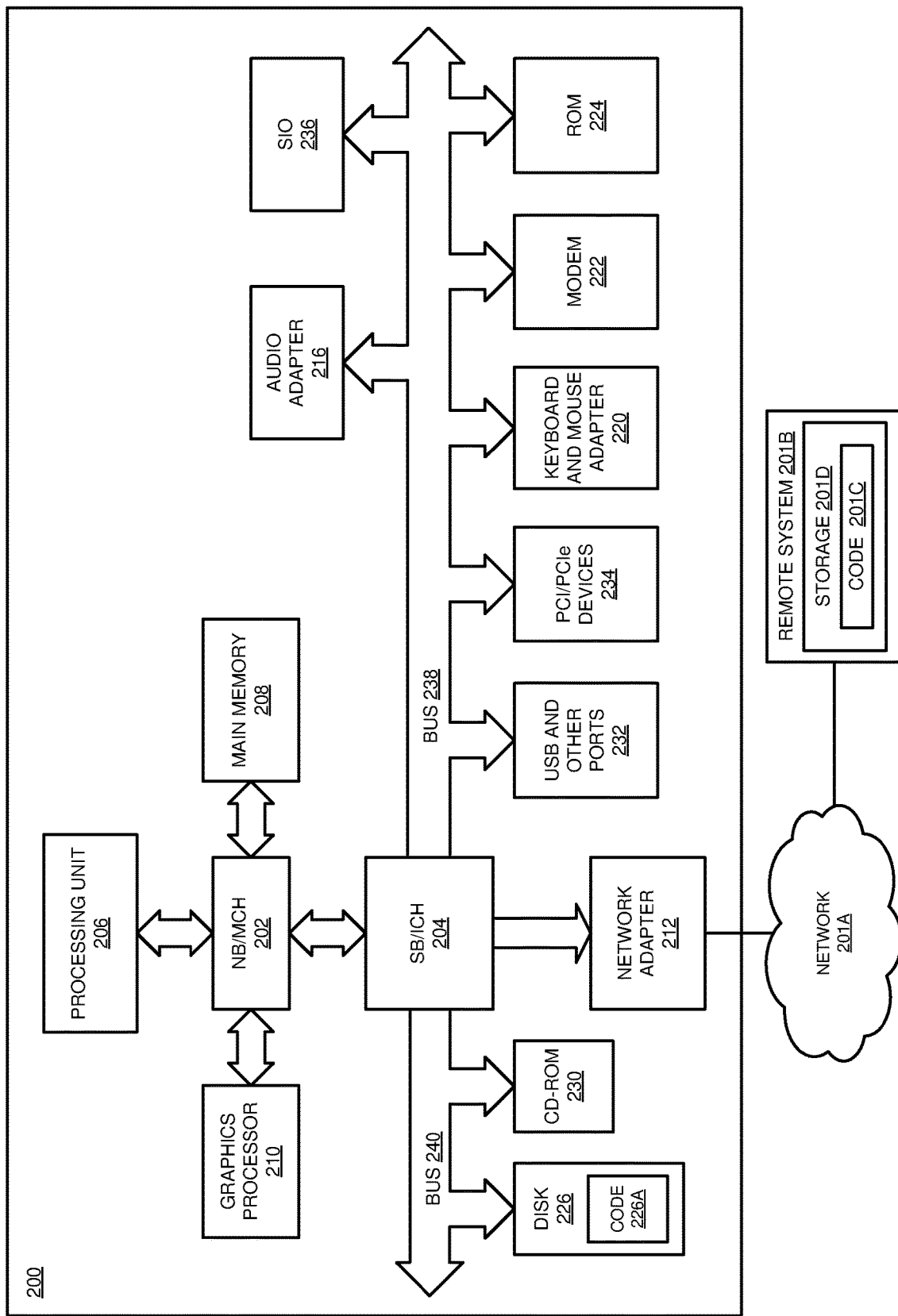
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

In an embodiment, the data processing environment 100 is a wireless communications system that includes the network 102 as a core network, server 106 as a radio access network node e.g. gNodeB (next generation node B base station), and device 132 as an end equipment, e.g. user equipment (UE) or IoT device. In an embodiment, the data processing environment 100 is a wireless communications system that is a Long-Term Evolution (LTE), LTE-Advanced (LTE-A) network, a 5G (fifth generation) mobile network, or a 5G New Radio (5G NR) network or other future network. In an embodiment, the data processing environment 100 is a wireless communications system that supports enhanced broadband communications, ultra-reliable (i.e., mission critical) communications, low latency communications, and communications with low-cost and low-complexity devices. In an embodiment, the server 104 manages a cloud computing environment that includes a plurality of cloud computing nodes, including a storage and retention intelligence function (SRIF) 140. The SRIF 140 includes a multi-layer hierarchy of nodes, including a central node 142, a middle layer node 144, and an end node 146. The central node 142 acts as the controlling node of the SRIF 140 and performs complex processing using machine learning algorithms. The central node 142 can mine big data repositories, apply complex algorithms and run long running processes to derive intelligence that can be stored and staged so as to be ready to provide on an on-demand basis to lower-order nodes or other central nodes. The middle layer node 144 provides load balancing between the central node 142 and the end node 146. The end node 146 collects data from network nodes and provides actionable insights to network nodes, such as UE device 132.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 115 or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
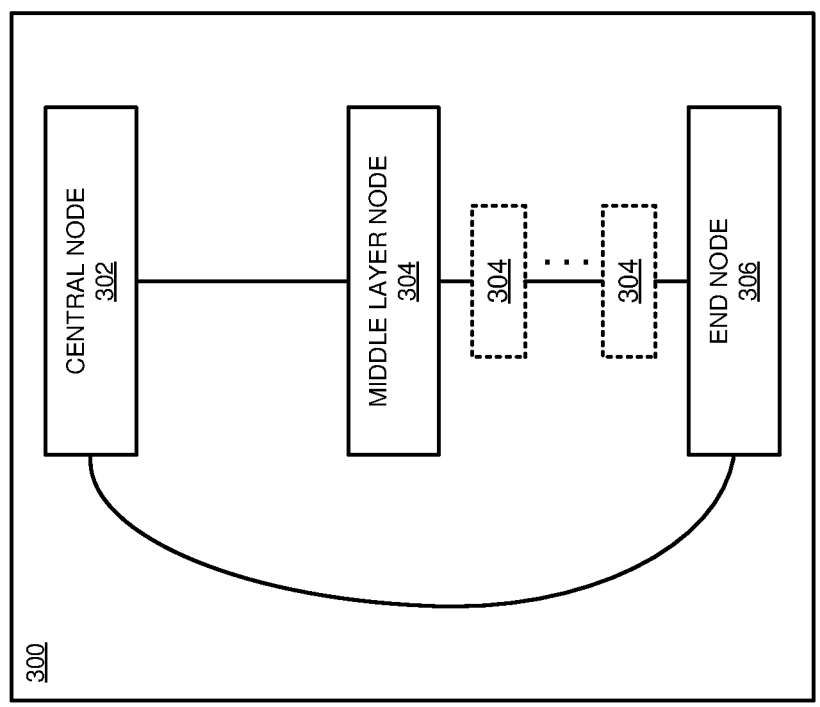
FIG. 3 depicts a block diagram of an example Storage and Retention Intelligence function (SRIF) system in accordance with an illustrative embodiment.

With reference to FIG. 3, this figure depicts a block diagram of an example Storage and Retention Intelligence function (SRIF) system 300 in accordance with an illustrative embodiment. The SRIF 300 is an implementation of the SRIF 140 in FIG. 1, and includes a central node 302, a middle layer node 304, and an end node 306, which are implementations of the central node 142, the middle layer node 144, and the end node 146 in FIG. 1. In an embodiment, the SRIF system 300 is a multi-tier system that includes three tiers because the key nodes are the central node 302 and the end node 306, while the middle layer node 304 complements the operation of the central node 302 and the end node 306, along with supporting management of the architecture and load balancing. In some such embodiments, the hierarchy of nodes is arranged with the central node 302 as the highest order node, the end node 306 as the lowest order node.

In some embodiments, for example if a CSP is very large or caters to multiple countries with country-specific deployment needs, the SRIF 300 includes a plurality of middle layer nodes 304 in hierarchy that provide multiple levels of load balancing and localized functional management. In such context middle layer nodes can have functional or traffic load balancing with multiple instances of middles nodes to provide flexibility in operation and design. The plurality of middle layer nodes 304 are serially connected in a hierarchy between the central node 302 and the end node 306 with the highest order middle layer node being closest to the central node 302 and the lowest order middle layer node being closest to the end node. In an embodiment, the SRIF system 300 configures the nodes 302, 304, and 306 such that lower order nodes have relatively less data storage capacity and relatively more processing power than higher order nodes. In some embodiments, a leaner operating SRIF system 300 includes only one middle layer node 304 because that is a simplified and appropriate design to support low latency operations.

The central node 302 is a controlling node of the hierarchical design. The middle node 304 is an intermediate node that acts as a balancing node between the central node 302 and the end node 306. The end node 306 is a high processing power node that interfaces with network nodes and collects data from them. The end node 306 also provides immediate actionable insights to network nodes with respect to data processing and decision making in mobile network.

The end node 306 builds intelligence based on knowledge extracted from data processing by the end node 306 or by the central node 302. For example, in an embodiment, the central node 302 and end node 306 each includes an analytics engine that autonomously develops machine learning models for classifying data. Non-limiting examples of bases for data classification can include one or more of (a) data collected from the telecom network, (b) business rules, (c) applicable regulatory requirements and legal framework, (d) policies from one or more different CSPs, and (e) data created by the central or end node, e.g., historical data.

In an embodiment, the central node 302 and end node 306 use the machine learning models to autonomously classify incoming data and generate metatags to associate with the data that allow for identification of the data classification and for subsequent information management processing. A non-limiting example of subsequent processing includes appraisal processing for determining the value of the data and establishing data retention and disposal policies for the data. In an embodiment, records disposal includes non-maintenance of data, invalidation of data, destruction of data, transfer of data (e.g., to an archive or repository for long term storage), or some combination thereof. Another non-limiting example of subsequent processing includes regulatory processing to identify data governed by laws, regulations, or other policies, for example related to privacy or data retention. In an embodiment, the data appraisal processing includes basing disposal decisions at least in part on one or more of laws and regulations related to the disposal of certain data. In an embodiment, the disposal process is documented to preserve evidence of proper disposal. In an embodiment, the central node 302 and end node 306 transfer or broadcast information extracted from the data, such as classifications, appraisals, retention or disposal information. In an embodiment, the central node 302 and end node 306 each performs real-time or near-real-time processing of the network data by establishing a continual input (from the network), processing, and output (to the network) stream, thereby providing real-time information to the network In an embodiment, the central node 302 and end node 306 each uses faceted classification that allows multiple classifications to be assigned to a data object, thereby allowing for a very agile and extensible approach to locating and further processing the data. A non-limiting example of such processing includes allowing searching and browsing of related data through several classes, such as activity, hardware, geographical information, and any others. In an embodiment, the central node 302 and end node 306 each has an analytics engine that correlates data collected by the central node 302 and end node 306 from various network data sources to eliminate data anomalies or measurement outliers that may skew or distort the results other data processing being performed on the network data. In an embodiment, the nodes 302, 304, and 206 communicate through a REST (REpresentational State Transfer) interface for simplified implementation. In another embodiment, the nodes 302, 304, and 206 communicate through other technical options, e.g. CORBA (Common Object Request Broker Architecture).

Figure 4:
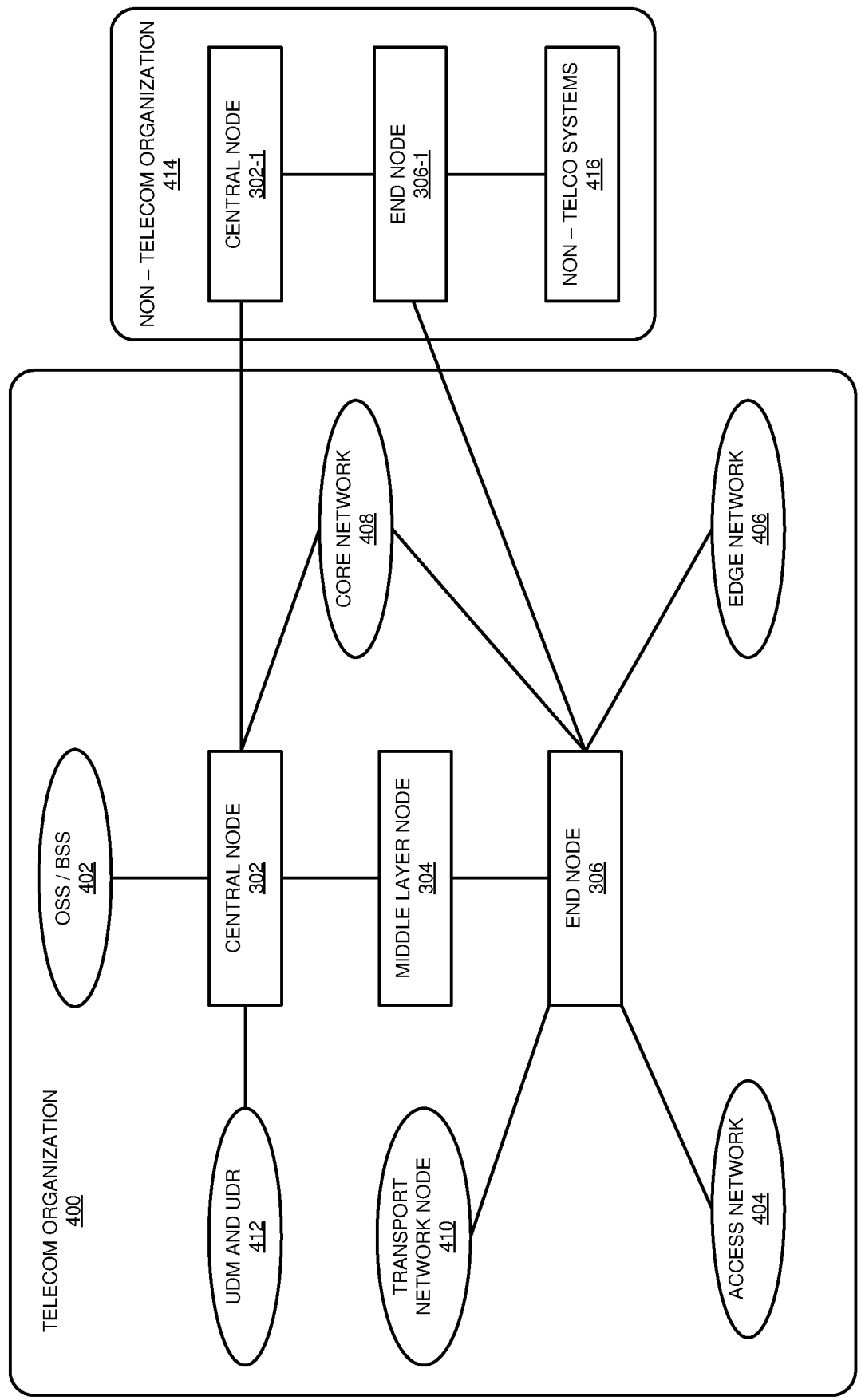
FIG. 4 depicts a block diagram of an embodiment of a telecom organization having Storage and Retention Intelligence function (SRIF) in accordance with an illustrative embodiment.

With reference to FIG. 4, this figure depicts a block diagram of an embodiment of a telecom organization 400 having Storage and Retention Intelligence function (SRIF) nodes 302, 304, and 306 in communication with network elements and Communication Service Provider (CSP) systems, for example an Operations Support System/Business Support System (OSS/BSS) 402, an access network 404, an edge network 406, a core network 408, a transport network node 410, a Unified Data Management (UDM) and Unified Data Repository (UDR) system 412. The access network 404, edge network 406, core network 408, transport network node 410, and UDM and UDR system 412 are described, for example, in "5G; System Architecture for the 5G System," ETSI TS 123 501 version 15.3.0, dated September 2018, and published by the European Telecommunications Standards Institute. The Operations Support System/Business Support System (OSS/BSS) 402 is representative of IT (Information Technology) systems used by service providers to manage and operate telecom services.

In an embodiment, the telecom SRIF nodes 302 and 306 interact with non-telecom SRIF nodes 302-1 and 306-1 in a non-telecom organization 414, which is representative of various exemplary non-telecom organizations such as Railways, Health, Weather, Police and Government. The non-telecom nodes include a central node 302-1 as an embodiment of the central node 302 described above, and an end node 306-1 as an embodiment of the end node 306 described above. In an embodiment, a non-telecom organization 414 also adopts the SRIF nodes 302-1 and 306-1 and integrate them with their own internal systems 416 to service telecom use cases involving non-telecom companies. In an embodiment, the non-telecom central node 302-1 is a lightweight standard central node like central node 302 in the telecom organization 400, so the use of the same type of node simplifies interfaces and integration between the telecom organization 400 and the non-telecom organization 414. In an embodiment, the non-telecom end node 306-1 is like the end node 306 in the telecom organization 400 and interacts with the end node 306 in the telecom organization 400 to support mission-critical use cases. For example, in an embodiment the non-telecom organization is a weather monitoring organization that becomes aware of a sudden storm at sea and can use their own end node 306-1 to contact telecom end node 306 to alert fishermen via telecom communications. Other examples involving the use of the SRIF system 300 in a non-telecom organization are industry specific and the SRIF system 300 can be used in such various applications that depend on the target use desired to be achieved.

Figure 5:
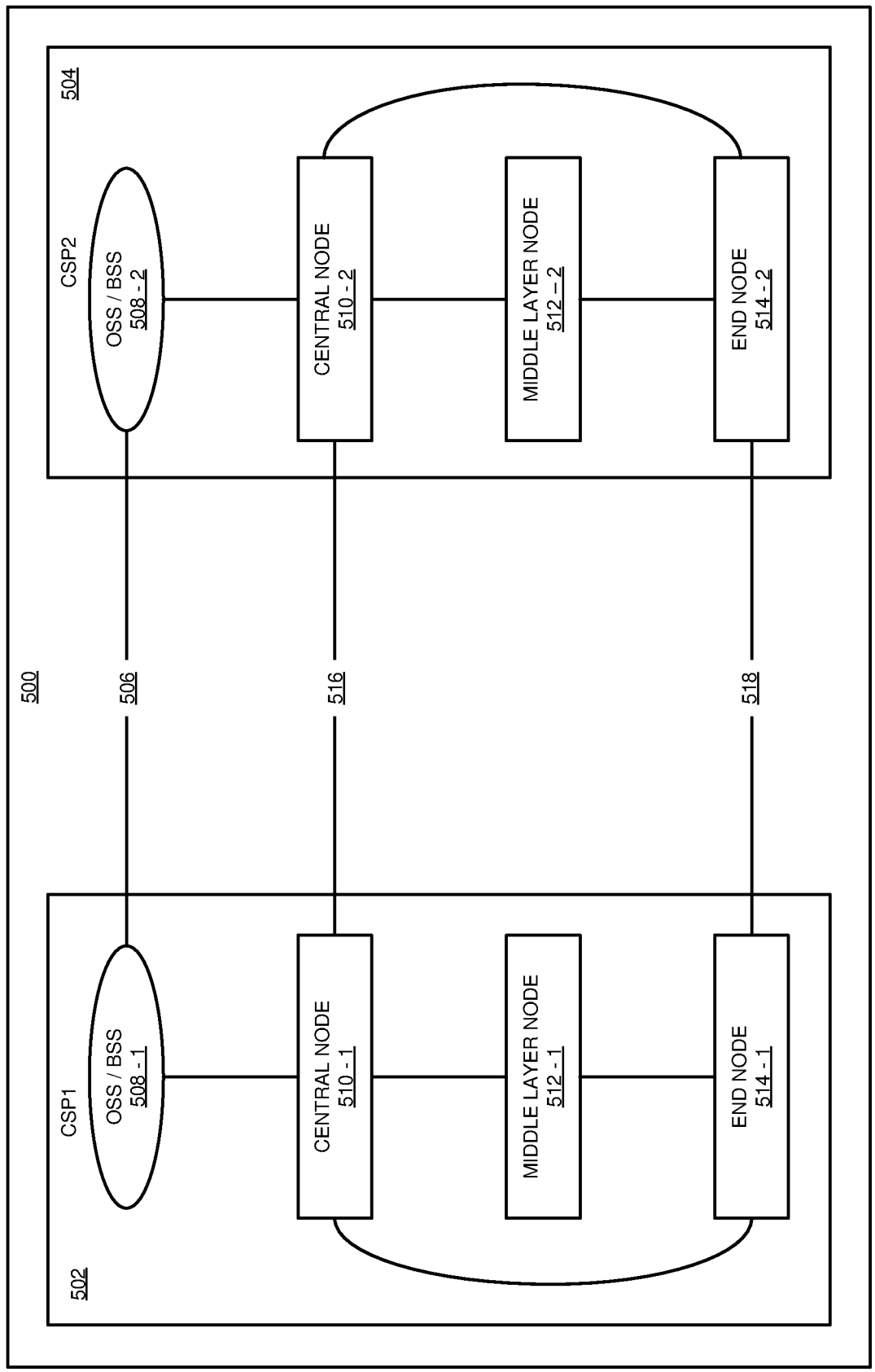
FIG. 5 depicts a block diagram of an embodiment of an interworking configuration for SRIF systems of first and second CSPs in accordance with an illustrative embodiment.

With reference to FIG. 5, this figure depicts a block diagram of an embodiment of an interworking configuration 500 for SRIF systems of first and second CSPs 502 and 504.

In an embodiment, an interface 506 provides communication between OSS/BSS systems 508-1, 508-2 of the two CSPs 502, 504 according to conventional practices for various purposes, e.g. billing and service assurance. Each CSP has an SRIF system that includes a central node 510, a middle layer node 512, and an end node 514, which correspond to the central node 302, middle layer node 304, and end node 306, respectively, described above in connection with FIG. 3. In some embodiments, the interface 506 is provisioned to additionally provide configuration data for the SRIF system between the two CSPs 502, 504, which will then be pushed to a central node 510 or to an end node 514. Direct sharing of configuration data between SRIF systems is not recommended due to inter-working complexity, legal & privacy aspect of data and control over network operations. Therefore OSS/BSS systems 508 can exchange this information and do any desired validation before pushing into SRIF nodes.

In an embodiment, an interface 516 serves as a direct interface between the central nodes 510 of the two CSPs. For example, in an embodiment, the interface 516 provides a conduit for sharing policy management information related network service control, such as network speed, service tier, Quality-of-Service (QoS), traffic control, traffic prioritization, service passes (e.g. use specific services), and roaming passes as expected of a customer of one CSP who is in the service area of another CSP. In an embodiment, the central nodes 510 structure the messages according to a mutually understood interface to enable cooperation and support preparedness in complex operating environments.

In an embodiment, an interface 518 serves as a direct interface between the end nodes 514 of the two CSPs. For example, in an embodiment the interface 518 provides a conduit for sharing mission-critical information and real-time service parameters that are essential to service a customer of one CSP to another. In an embodiment, the end nodes 514 share information on operation parameters, e.g. warning that a very large volume of data is about to arrive but has limited value so it can be ignored, or advance notification to enhance processing because a mission-critical data load is about to arrive.

Figure 6:
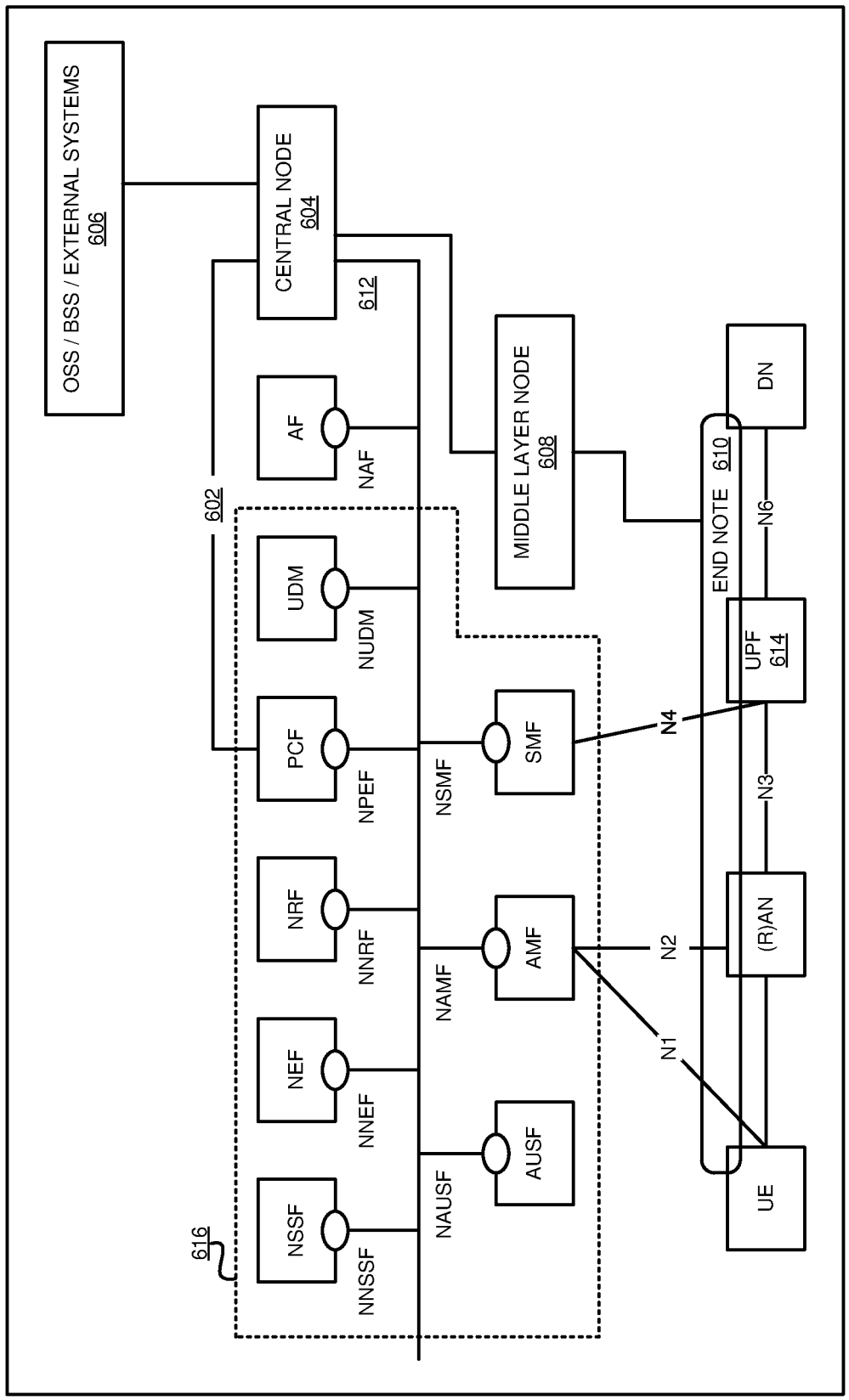
FIG. 6 depicts a block diagram of an embodiment of SRIF system nodes overlaid on a 5G system architecture in accordance with an illustrative embodiment.

With reference to FIG. 6, this figure depicts a block diagram of an embodiment of SRIF system nodes overlaid on a 5G system architecture in the non-roaming case, using the reference point representation showing how various network functions interact with each other. The 5G System architecture supports data connectivity using Network Function Virtualization and Software Defined Networking. In the 5G architecture, procedures are defined as services, and FIG. 6 shows the architecture using a service-based representation and a reference point representation. The service-based representations are shown by referencing applicable network functions (e.g., Nnssf, Nnef, Nnrf, etc.), whereas reference point representations are shown as point-to-point references (e.g., N1, N2, N4). The 5G System architecture includes the following network functions (NF): Authentication Server Function (AUSF), Access and Mobility Management Function (AMF), Data Network (DN), Network Exposure Function (NEF), Network Repository Function (NRF), Network Slice Selection Function (NSSF), Policy Control Function (PCF), Session Management Function (SMF), Unified Data Management (UDM), User Plane Function (UPF) 614 (also referred to as user plane 614), Application Function (AF), User Equipment (UE), and (Radio) Access Network ((R)AN), which are described, for example, in "5G; System Architecture for the 5G System," ETSI TS 123 501 version 15.3.0, dated September 2018, and published by the European Telecommunications Standards Institute.

The configuration shown in FIG. 6 is a Control-/User Plane Separation (CUPS) architecture that has a control plane 616 that carries the signaling traffic and a user plane 614 that carries the network user traffic. The configuration shown in FIG. 6 also includes an authentication server function (AUSF), a unified data management (UDM), an SMF, (e.g., in communication with a data network (DN)), policy control functions (PCFs), and authorization functions (AFs). In addition, the illustrated configuration includes other functions or entities not displayed within the figure, or may not include one or more of the functions or entities shown. Various interfaces may be established between the different entities in the illustrated embodiment. The interfaces may be denoted by N numbers, and sometimes may be called communication links. Such interfaces may refer to a communication link between network entities, a packet scheme, data permissions allowed between the entities, other features of the communication links, or combinations thereof.

The AUSF provides authentication services for UEs. For example, AUSF initiate authentications of a UE and provides NAS security functions for a UE based on a request from AMF over communication link N12. In some cases, the authentication and security function may be based on information stored in an entity (e.g., a UDM). The entity e.g., a UDM) may support an authentication credential repository and processing function (ARPF) that stores the long-term security credentials used in authentication. The AUSF retrieve information from the entity (e.g., UDM) over communication link N13.

The SMF provides session management services for UE. Specifically, SMF establishes, modifies, and releases sessions (or bearers) for communication between UE and DN. For example, SMF may maintain a tunnel for communication between UPF and an access network (AN) node. In addition, SMF allocates and manages IP addresses for the UE, select and control user plane functions, configure traffic steering at UPF to route traffic to proper destinations, terminate SM parts of NAS messages, provide roaming functionality, etc.

The UPF include functionality for serving as the point of interconnect to DN for an external PDU session. The UPF routes and forwards packets to and from DN, inspect packets and enforce policy rules in the user plane 614, report traffic usage, handle quality of service (QoS) for user plane packets, verify uplink traffic, etc. The PCF supports a unified policy framework to govern the behavior of the network. Specifically, the PCF provides policy rules to control plane 616 functions to enforce them. In some cases, the PCF retrieves subscription information from a subscription repository at a UDM. The AF supports services for authorizing a UE for access to a network.

The PCF manages policies for the various UEs of the wireless communications system architecture. The core network communicates policies to UEs in the wireless communications system architecture to improve the quality of communication links and improve the quality of service. The PCF may interact with a number of other functions (e.g., AMF and SMF) in the illustrated wireless communications system architecture.

The AMF is configured to provide policy information from the PCF to the UEs. The PCF includes such policy information stored on memory or the like. The policy information may be communicated between the PCF and the AMF via a network interface or a communication link. In some examples, the network interface is an Ni interface. The policy information includes access network discovery and selection policy, route selection policies, an SSC mode selection policy, a network slice selection policy, a DNN selection policy, a non-seamless offload policy, other policies or combinations thereof. The access network discovery and selection policy is used by the UE for selecting non-3GPP accesses and for deciding how to route traffic between the selected 3GPP and non-3GPP accesses. The route selection policies are used by the UE to determine how to route outgoing traffic. Traffic can be routed to an established PDU session, can be offloaded to non-3GPP access outside a PDU session, or can trigger the establishment of a new PDU session. In some examples, the route selection policies may include the SSC mode selection policy, the network slice selection policy, the DNN selection policy, and/or the non-seamless offload policy.

The SSC Mode Selection Policy (SSCMSP) is used by the UE to associate UE applications with SSC modes and to determine the PDU session which this traffic should be routed to. It is also used to determine when a new PDU session should be requested with a new SSC mode. The network slice selection policy (NSSP) is used by the UE to associate UE applications with SM-NSSAIs and to determine the PDU session which this traffic should be routed to. It is also used to determine when a new PDU session should be requested with a new SM-NSSAI. The DNN Selection Policy is used by the UE to associate UE traffic with one or more DNNs and to determine the PDU session which this traffic should be routed to. It may also be used to determine when a PDU session should be requested to a new DNN. It may also indicate the access type (3GPP or non-3GPP) on which a PDU session to a certain DNN should be requested. The non-seamless offload policy may be used by the UE to determine which traffic should be non-seamlessly offloaded to non-3GPP access (e.g., outside of a PDU session).

In some wireless systems (e.g., a 5G wireless system), a UE accesses a DN to exchange data packets using a PDU session. The PDU session provides a PDU connectivity service, which supports the transmission of one or more PDUs between UE and the DN. An association between UE and the DN in a PDU session uses internet protocol (IP) or Ethernet, or the association is unstructured. In some cases, DN is an example of a local DN, central DN, public land mobile networks (PLMNs), etc.

As illustrated the different functions of a core network is virtualized to support a more flexible architecture. That is, the different functions described above may be implemented in software. In such cases, a UE communicates with DN, SMF, PCF, etc. via the N3 communication link between RAN and UPF. The N3 communication link is a data connection for the UE.

In an embodiment, an interface 602 provides a communication conduit between a central node 604 and the PCF, and an interface 612 provides a communication conduit to communicate with other 3GPP standard nodes on same data plane. A middle layer node 608 is connected between the central node 604 and an end node 610. The central node 604, middle layer node 608, and end node 610 correspond to the central node 302, middle layer node 304, and end node 306, respectively, described above in connection with FIG. 3. In an embodiment, in general, external connections with the central, middle layer, and end nodes 604/608/620 are such that the central node 604 communicates with, and collects data from, the core network, and the end node 610 communicates with, and collects data from, the Access Network (i.e., the UE, (R)AN, UPF, and DN), edge, or data network (DN). In an embodiment, the access network is a telecommunications network that connects subscribers to their immediate service provider, and the core network (for example the Network Switching Subsystem in GSM) is a telecommunications network that provides centralized functionality, e.g. switching and connects internal nodes or local providers to one another. In an embodiment, the central node 604 collects data from the core network of telecom service provider, including the UDM, UDR and PCF. In some embodiments, the central node 604 can receive some or all of such data from the network nodes like UDM, UDR and PCF.

In an embodiment, the central node 604 collects data from other industry systems e.g. security, health etc. can happen through central node as preference for simplified design but otherwise its up-to implementation if end nodes are preferred for such collection points.

Figure 7:
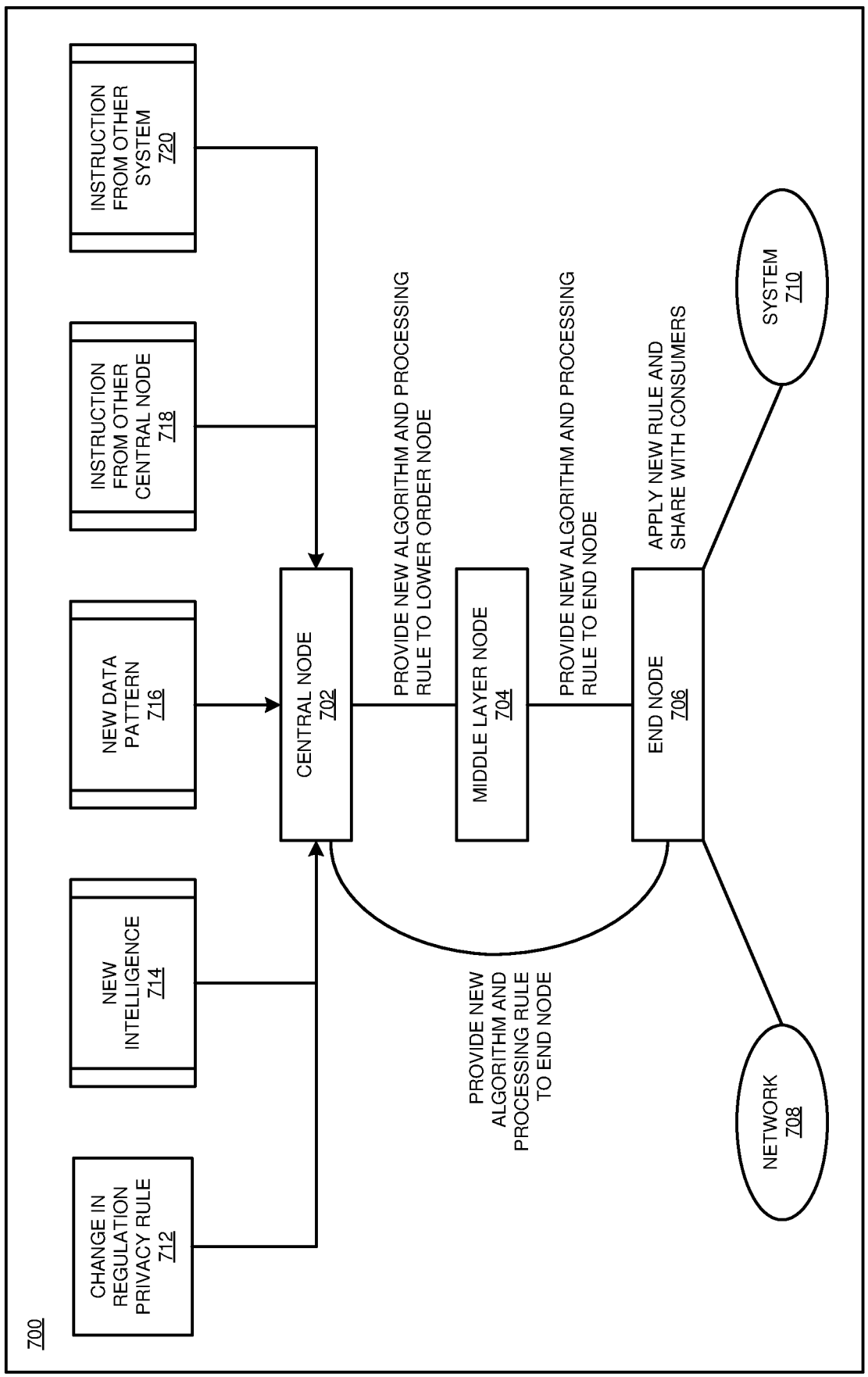
FIG. 7 depicts a block diagram of an SRIF system showing external triggers for its central node in accordance with an illustrative embodiment.

With reference to FIG. 7, this figure depicts a block diagram of a SRIF system 700, showing external triggers for its central node 702. The central node 702 acts as the "brains" of the system with a reservoir of historical data in the form of pre-processed data and complex business logics. The central node 702 is not a UDM/UDR but takes data from the UDM/UDR to build its algorithm. The central node 702 is an intelligent function that runs complex logics to build intelligence around data processing, which is applied on a network node or shared with other nodes/service providers/ industry verticals. The UDM/UDR are focused on data storage and management, whereas the central node 702 is focused on how to act upon data and predict future actions for data in the form of policy, business rules, or directives. In an embodiment, the central node 702 has software capability to perform one or more of the following functions:

Complex data extraction exercise

Data pre-processing, knowledge extraction and sorting for ready future use

Defining data privacy rules, applying at central node, sharing privacy policy with other systems and End nodes of SRIF (the way PCF is owner of network associated policies, SRIF is owner of all data & privacy associated policies)

Large scale data storage enablement

Cognitive capabilities in prediction of data, future action

Algorithm for complete data lifecycle i.e. collection, storing, processing, extraction, prediction and archiving Business enablement functions to understand legal & regulatory requirement and apply algorithm on stored as well as future data based on them Communication channel to integrate with lower order nodes, such as providing defined instructions to lower order nodes, collect data from them and service the requests for any knowledge or associated data from lower order nodes Communication channel to integrate with other central nodes to provide intelligence for moving subscribers, complex logic sharing request/response, providing intelligence around data processing based local algorithm e.g. regulations and legal framework of home country, requesting for intelligence, performing coordination act to serve the network and user use-case—as an analogy like how intelligence agencies of cooperating countries work together Communication with other service or industry vertical e.g. health, transport, media etc.

Integrate with network nodes to provide processed data, algorithm or business rule.

In an embodiment, the middle layer node 704 has software capability to perform one or more of the following functions:

Act as a balancing node between end nodes and central nodes

Establish and coordinate the sharing of information between end nodes of different SRIF systems Store hot data sets and makes them readily available to end nodes Provide data masking and security features, logics and enable processing on masked data Build an algorithm to support end nodes Communicate with central and end nodes Cognitive decision making in complex operating scenarios for example at time of data burst In an embodiment, a middle layer node 704 is in communication with a middle layer node of another SRIF system, however this arrangement adds complexity for limited benefit, so other embodiments omit this feature. In an embodiment, the end node 706 (and lower-order middle layer nodes in embodiments having plural middle layer nodes) are high-performance computing devices having built-in business logic and machine-learning algorithms that allow them to make prompt decisions when encountering a storm of data, for example from the user plane 614 or control plane 616 of this or another network 708 or system 710 with prompt decisions. In an embodiment, the end node 706 has very limited storage capability and therefore needs to be extremely efficient. In an embodiment, the end node 706 has software capability to perform one or more of the following functions:

Collection of user plan and control plan data from network nodes for analysis

Recommend data privacy rules to network nodes, applying the business rules before enabling sharing among nodes.

Filtering of data—intelligence extraction from data and fast forwarding to middle layer node Filtering of data based on business logic, central node/middle node instructions, predictability of data, or other processing logic that is derived based on data learning or analysis.

Utilize a communication channel directly with higher order nodes and push data to higher order nodes Utilize a communication channel with end nodes of the same or other CSPs or any other industry service provider e.g. Health, police/security, transport, media etc.

Integrate with network nodes to provide processed data, algorithm or business rules In an embodiment, the SRIF system nodes 702, 704, and 706 are not network nodes, but instead are specialized data processing nodes that provide data-related intelligence and processing to network nodes, and interface with data nodes of other communication service providers or other industry verticals e.g. health, security, transport, education, media.

In an embodiment, the SRIF nodes 702, 704, and 706 are designed to work in the overall 5G eco-system under following working principles. The nodes preferably are pre-integrated with systems and network functions. The central node 702 is configured based on pre-defined business rules and data policies. The central node 702 configures the middle layer node 704 and end node 706 based on its own configuration. In alternative embodiments, local configurations are instead done in one or both of the middle layer node 704 and end node 706.

In an embodiment, one or more of the following elements are included in a configuration package, apart from setup and basic functioning of software in nodes:

Data Collections, storage & processing policy rules

Data privacy rules

Data sharing rules

Industry vertical specific rules

Data storage & retention rules

Data archiving rules

Algorithms for above mentioned rules

Algorithms for exception handling and decision making

Once SRIF nodes 702, 704, and 706 are integrated and start functioning, then end nodes 706 and central nodes 702 share basic data handling rules and algorithm with respective network nodes, operating, and support systems (OSS/BSS or others). In some embodiments, the SRIF node rules and algorithms are initially configured to be understood by legacy network nodes and operating systems according to their basic functionality.

In an embodiment, a SRIF system is providing a service to the telecom network and is integrated with the telecom network using a service-based architecture that allows it to be encapsulated from the perspective of the telecom network and abstracted away. The SRIF system can therefore be integrated with a preexisting telecom network that also employs a service-oriented architecture, allowing the telecom network to maintain service autonomy. Once the SRIF system is ready and normal function of the telecom system and network continues, then there is very little or no interaction between SRIF system and the configuration of the various services of the telecom network/system. In an embodiment, during normal operation the central node 702 is the only SRIF node that collects sample data from the telecom network and systems, for example from the OSS 402 (shown in FIG. 4) or other network nodes or systems. In an embodiment, the SRIF system operates in a support capacity for the telecom network or system with little or no impact on the operation of the telecom network or system. In an embodiment, the SRIF nodes 702, 704, 706 provide support to the telecom network primarily when there is a deviation in an operating scenario, when a business rule triggers one or more of the SRIF nodes 702, 704, 706 to provide support to the telecom network nodes, or when a telecom network node or system needs support of one or more of the SRIF nodes 702, 704, 706 for handling certain data.

Figure 8:
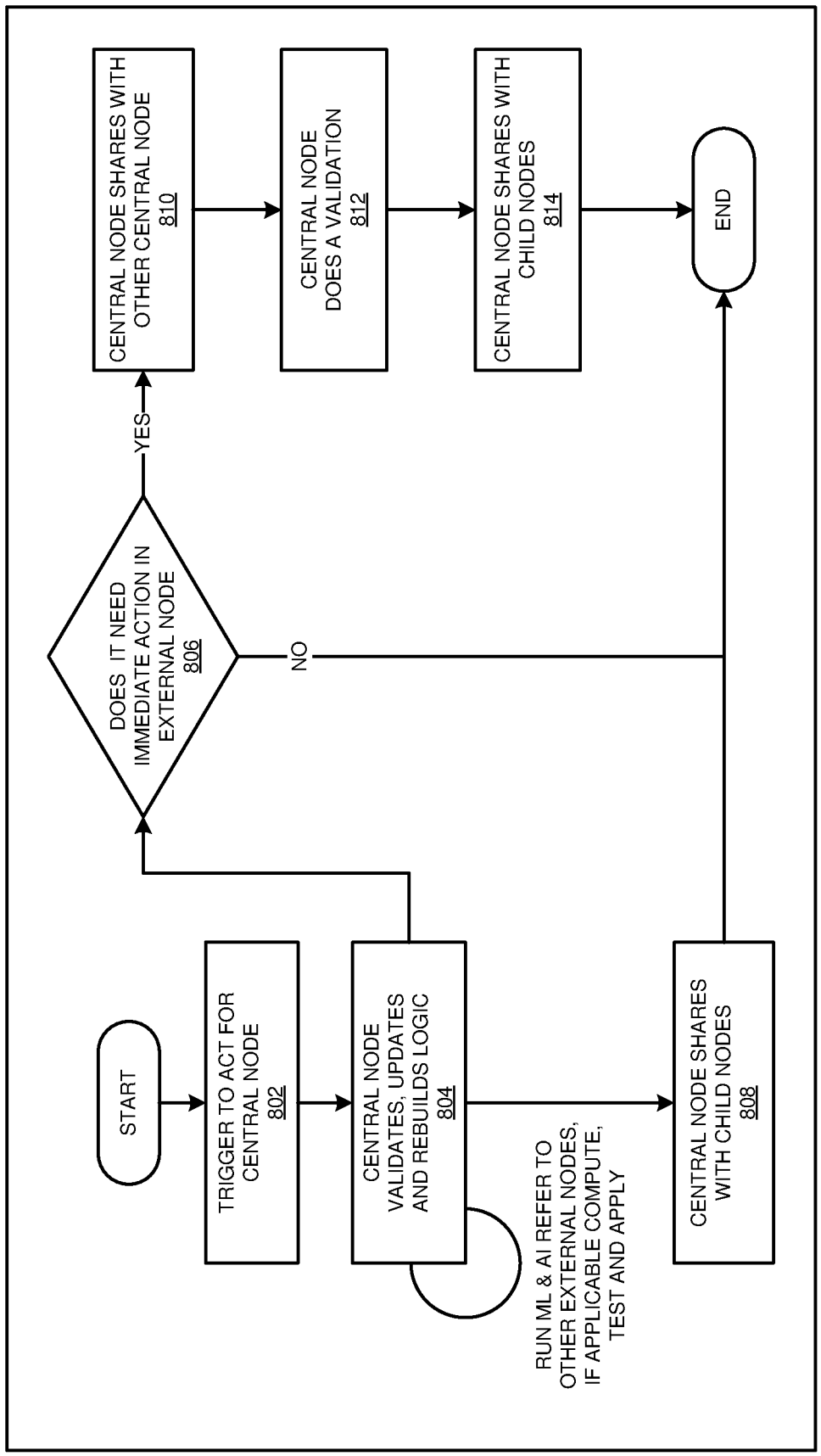
FIG. 8 depicts a flowchart of an example process for managing rule changes in a telecom network in accordance with an illustrative embodiment.

Still referring to FIG. 7 with reference now also to FIG. 8, this figure depicts a flowchart of an example process 800 in accordance with an illustrative embodiment for managing rule changes in a telecom network. In some embodiments, at block 802 the central node 702 is triggered to act by change data 712 from the user plane 614 or control plane 616 indicative of changes in external business rules, privacy rules, regulations, or other triggers for re-computation and rule building. In an embodiment, the central node 702 receives the change data or rule from information source mentioned in FIG. 7. In an embodiment, at block 804, the central node 702 receives such rule changes, validates and evaluates them to determine impact on the rules being changed, including whether the rule impacts other systems or nodes external to the central node's SRIF network based on rule-scope information provided with the received rule information. If the central node 702 determines that the rule affects other systems or nodes, the process continues to block 806; otherwise, if the central node 702 determines that the rule does not affect other systems or nodes, the process continues to block 808.

At decision block 806, the central node 702 determines whether the updated rule needs immediate action in external systems or nodes. If so, the process continues to block 810 where the central node 702 notifies other central nodes (e.g., within the same CSP, at another CSP, or at an industry vertical) about the rule change and how to handle the rule change in order to accelerate adoption and implementation of the new rule across large numbers of systems and nodes.

In an embodiment, any change in data privacy rules or regulations that happen from time to time needs validation and updating around data processing processes instructions within telecom systems and telecom network nodes. Hence, the rule changes have the potential to trigger a new configuration or modification in an operation algorithm somewhere in the telecom network or system. In an embodiment, at block 812 the central node 702 automatically detects the need for validation and updating based on rule changes and, at block 814, helps complete the validation and updating process across the telecom network and systems.

At block 808, the central node 702 shares the updated rules with child nodes (i.e., middle layer node 704 and end node 706), and the process ends. In an embodiment, the central node 702 receives information from an external analytics platform or intelligence function 714 from the user plane 614 or control plane 616 that triggers re-computation or modification of an algorithm in the central node 702 for refined processing. In an embodiment, the central node 702 receives a new data pattern 716, for example from the user plane 614 or control plane 616 of the telecom network, from a lower order SRIF node 704 or 706, or from any other interfaced system, where the new data pattern 716 brings new intelligence information to the central node 702 that triggers the central node 702 to take an action for an improvement in how the central node 702 processes data. In an embodiment, the central node 702 receives information 718 from one or more other central nodes at other CSPs or industry verticals.

In an embodiment, the central node 702 receives information 720 from OSS/BSS functions from other systems related to service composition, inventory, billing and charging, and customer profiles, including instructions to the central node 702 for application of data processing rule in certain interface-compatible format. The customer's home and visitor network may require a change in operation based on such instructions. For example, a subscriber with general data profile joins National security service. Now the subscriber identity and location information need extra protection and are monitored sharing their profile needs to be changed to new data profile. In this case BSS systems or network functions like UDM that trigger updates in the SRIF system. In an embodiment, the SRIF nodes does a detailed validation, decomposition and identifies impacts/changes, and makes sure that all computing in network eco-system is in line with the new profile without affecting normal process. In an embodiment, an if subscriber had IoT services that were being supported at network Edge then End nodes 706 support Edge nodes in managing day to day operations without violating policy or breaching privacy.

Figure 9:
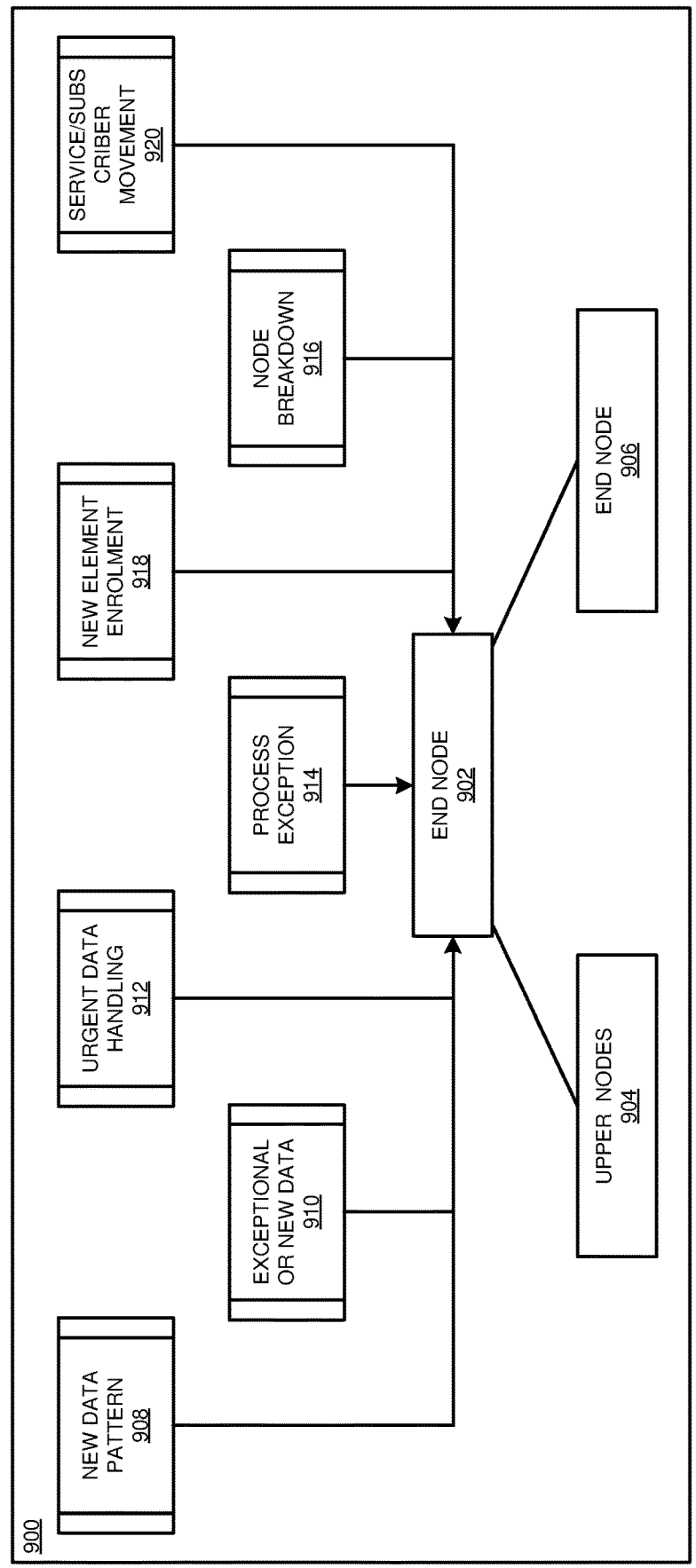
FIG. 9 depicts a block diagram of an SRIF system showing external triggers for its end node in which illustrative embodiments may be implemented.

With reference to FIG. 9, in an embodiment the end node 902 is in communication with many telecom network entities including those in the control plane 616 and user plane 614, for example User Equipment (UE), and (Radio) Access Network ((R)AN), User Plane Function (UPF) 614, and Data Network (DN), and receives new data patterns 908, exceptional or new data 910, urgent data handling requests 912, process exceptions 914, node breakdown notifications 916, new element enrollment notifications 918, and service/subscriber movement data 920. As shown in FIGS. 3 and 4, the end node 902 also interfaces with upper nodes (e.g., middle layer node(s) and central node) 904 and end nodes 906 of other CSPs or industry verticals. In an embodiment, the end node 902 is contacted by any telecom network or dependent system for data that contributes to processing intelligence. End node 902 tries to resolve the request and provide assistance on its own until it needs intelligence from an upper node 904 (e.g., a central node) or needs to contact another End node 906. For low latency and high reliability services, the communication can be across End nodes 906 of other service providers or industry vertical. End nodes 902 can also send messages to upper nodes 904 (e.g., central node) when it the end node 902 determines that some received data is beneficial for contributing to future analysis, for example a new pattern or newly discovered dataset.

Figure 10:
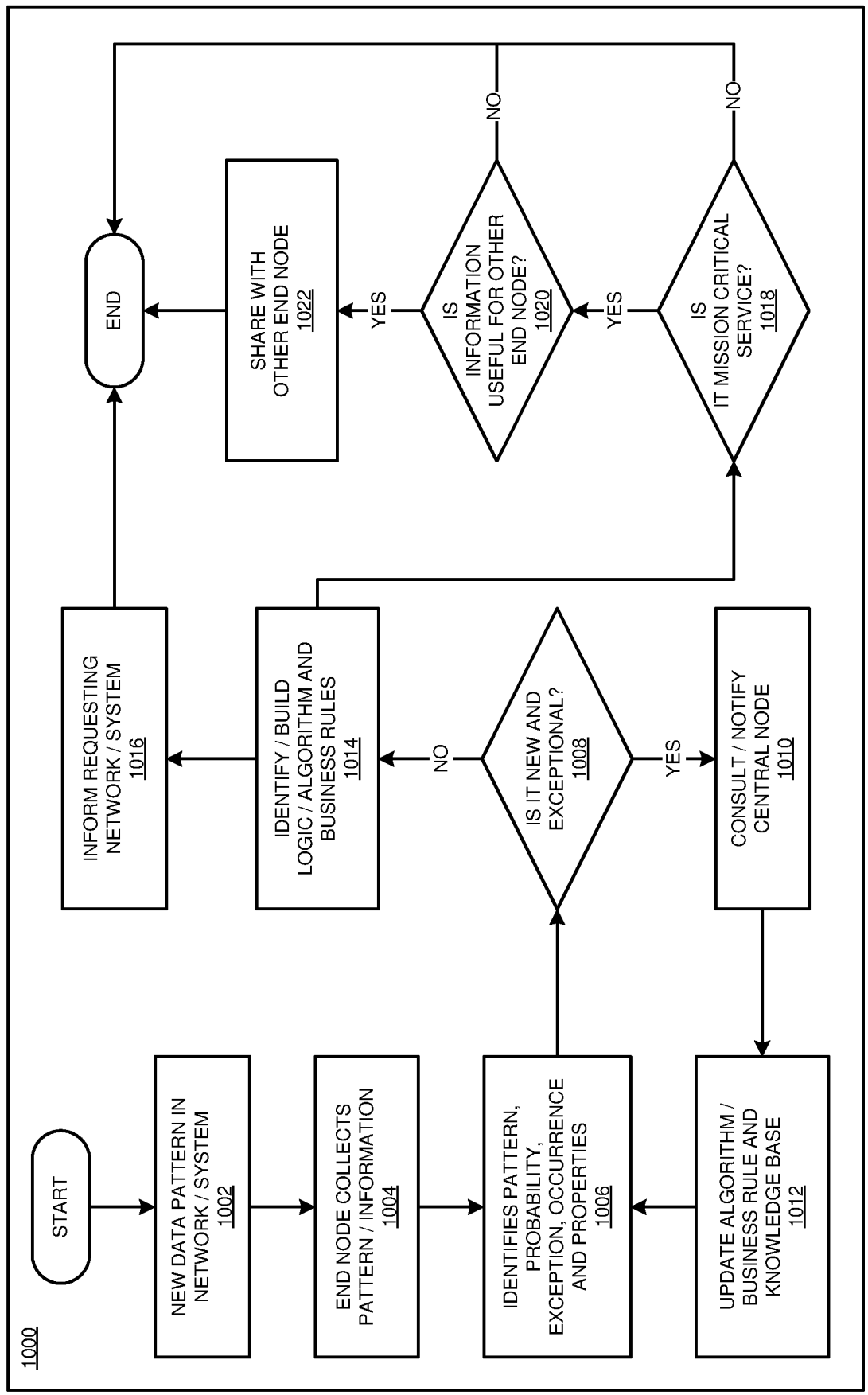
FIG. 10 depicts a flowchart of an example process for managing a new data pattern in accordance with an illustrative embodiment.

With reference to FIG. 9 and now also to FIG. 10, a flowchart in FIG. 10 shows an example process 1000 for the end node 902 in FIG. 9. The process 1000 is for handling new data patterns, where "new" data patterns are data patterns that are unknown and therefore will be analyzed to try to identify what the new data pattern represents. In an embodiment, the end node 902 concludes that a data pattern is unknown and new based on a confidence value resulting from a machine-learning or data-mining process performed on the data pattern. For example, a first confidence value (or first range of confidence values) is indicative of the data pattern being likely to match a known type of data pattern, and a second confidence value (or range of confidence values) is indicative of the data pattern being unlikely to match a known type of data pattern.

In an embodiment, at block 1002, a new data pattern emerges in the data in the network/system 900 shown in FIG. 9. In an embodiment, the network/system 900 includes the user plane 614 and control plane 616 shown in FIG. 6 and edge network 406 shown in FIG. 4. Rather than process the new data pattern by network nodes in the network/system 900, the network nodes offload the processing to the SRIF to process and reply with an answer, relieving the network node of the processing burden and thereby allowing for improved low-latency support in the network/system 900.

At block 1004, the end node 902 receives the data containing the new data pattern. Here, the end node 902 receives a data processing request from a network rather than the request being routed directly to the central node 702 (i.e., upper node 904) as is done in FIG. 8. The end node 902 is configured to be faster and able to support low-latency requirements of the access and data networks, and will attempt at block 1006 to quickly reply to the request if the pattern is known to the SRIF. When the end node 902 initially receives the new data pattern, the end node 902 does first hand analysis to determine if the pattern is known to the SRIF, or has a pattern that is known, can be created with existing knowledge, or is predictable. If so, then the end node 902 does not need input or support from any other node and can respond on its own to the originating network node that made the request.

In an embodiment, at block 1006, the end node 902 performs an evaluation operation by using one or more machine-learning engines to analyze structured and unstructured data samples collected by various nodes from sensors, IoT devices, and various other sources, and learns from correlations among successive data samples by adjusting and improving a machine learning algorithm. At block 1008, the end node 902 uses the results from its analysis of the new data pattern to determine whether to request processing support by the central node ("Yes" from block 1008) or respond directly to the requesting node ("No" from block 1008). In an embodiment, the end node 902 makes the decision at block 1008 based on whether the data pattern was recognized by the end node 902 at block 1006, and also based on whether the data is exceptional. In an embodiment, exceptional data includes any data representative of a condition that requires handling (e.g., a problem such as a defective memory device or an intrusion alert from a motion sensor). In an embodiment, the end node 902 determines the data pattern to be exceptional based on a source of the data pattern, other data related to the data pattern, or a property of the data containing the unknown data pattern.

In an embodiment, the upper node 904 (e.g., central node) is provided with relatively high amounts of processing power and learning models for translating such unknown and exceptional data patterns into a rule set applicable to the data that is communicated back to the end node 902 and then to the originating node. In an embodiment, the end node 902 uses the upper node 904 as a remote resource for processing unknown and exceptional data because of the high amounts of processing power that is often involved in processing such data, and by offloading such demanding tasks to the central node, the end node 902 is better able to support a low-latency network.

If the end node 902 decides to send the sample to the central node, then the corresponding rule set is sent at block 1010, and the end node 1012 updates the algorithms/business rules/knowledgebase according to new data pattern. In an embodiment, the end node 902 also receives intelligence related to the data pattern, allowing the end node 902 to recognize the data pattern and apply the applicable rule set if such a data pattern is received in the future. At block 1014 the end node 902 identifies an identity, algorithm, or business rule, if any, associated with the new data pattern. At block 1016, the end node 902 shares its information about the new data pattern with the at least the requesting network/system. In parallel with block 1016, blocks 1018 to 1022 show a process the end node 902 follows to determine whether to report the new data pattern to other end nodes at block 1022. At block 1018, the end node 902 determines whether the new data pattern and associated rule/algorithm is mission critical. At block 1020, the end node reviews the information gathered about the new data pattern to determine if it would be useful to any other node. If "Yes" at block 1018 or block 1020, the process ends. Otherwise the process continues to block 1020, where the end node 902 shares information about the new data pattern with other nodes.

Figure 11:
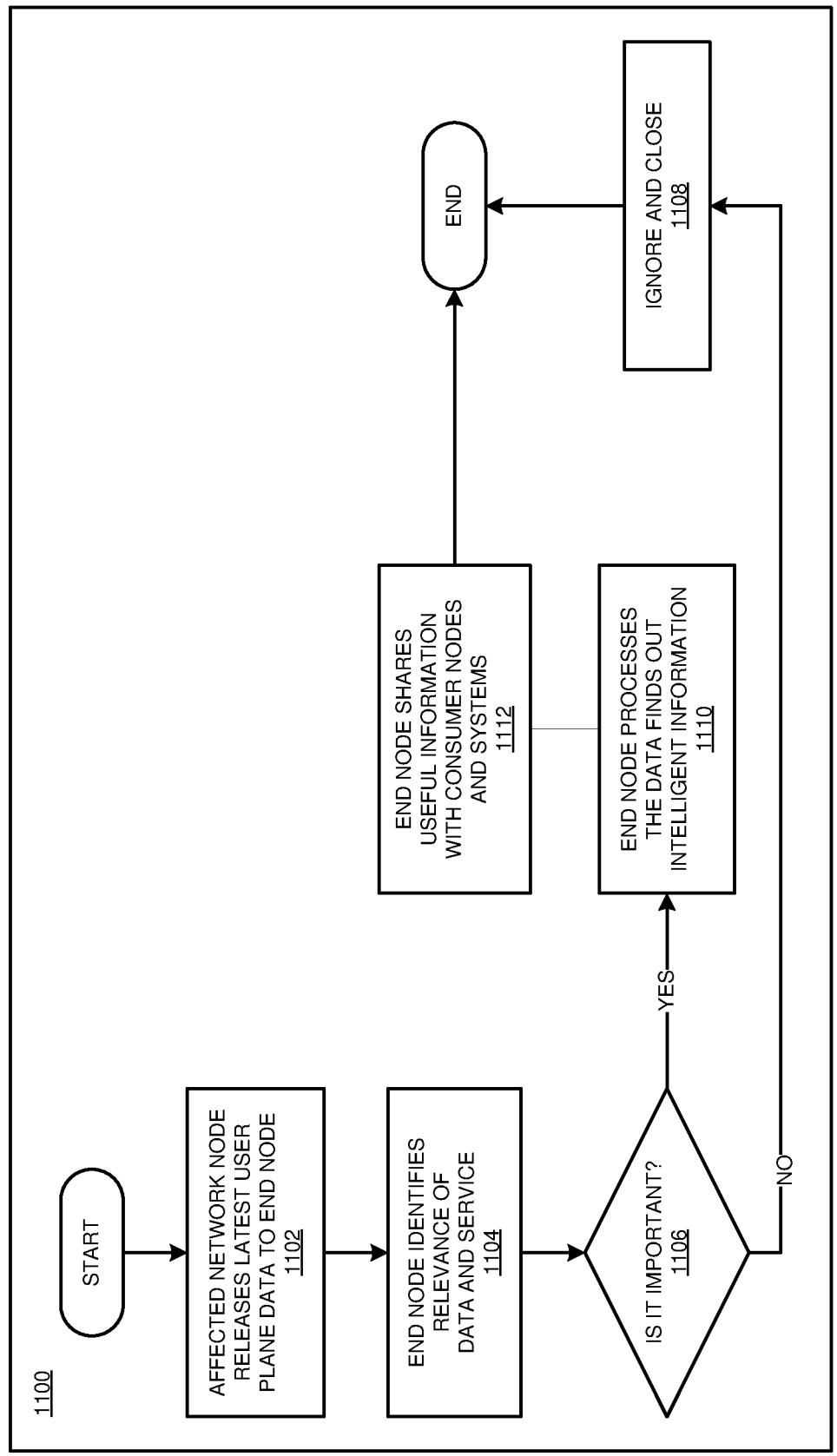
FIG. 11 depicts a block diagram of flowchart of an example process managing user-plane data during a network outage in accordance with an illustrative embodiment.

With reference to FIG. 11, this figure depicts a flowchart of an example process 1100 in accordance with an illustrative embodiment. Normally user-plane data is lost during a network outage, but in most scenarios the lost data is not important. But in 5G and future networks there are going to be scenarios where user-plane data will be very useful for making network/control-plane level decisions for serving a customer. It is important to analyze if a particular data set is actually relevant for sharing, or if some intelligence can be extracted and shared as lightweight data, or if it can be completely ignored for efficient operations.

Embodiments of the SRIF system can be very useful in this scenario. For example, at block 1102, network functions that carry user-plane data push sample data to the end node 902. At block 1104, the end node 902 performs an evaluation operation by identifying the relevance of the data and service. Then, at decision block 1106, the end node 902 determines if the sampled data is important. In an embodiment, the end node 902 concludes that data is important based on an importance value resulting from a machine-learning or data-mining process performed on the data pattern. For example, a first importance value (or first range of importance values) is indicative of the data being important, and a second importance value (or range of importance values) is indicative of the data being important. If it is not important, then at block 1108 the sample data is ignored, and the process ends. Otherwise, if the sample data is important, the end node 902 processes the data to find the useful pieces of information, and at block 1112 the end node shares the useful pieces of information with consumer nodes and systems, after which the process ends.

As a non-limiting explanatory example, details generated by a thermostat in a room are stored on a network node, including period temperature measurements. During a first time period, the temperature measurements remained within an expected range, fluctuating between 72° F. and 75° F., but during a second time period, the temperature in the room started quickly falling from 72° F. to 53° F. At block 1102, the end node 902 receives the temperature data for the first and second time periods. At block 1104, the end node 902 performs an evaluation operation by analyzing the temperature data and recognizing the temperatures to be normal during the first time period, but abnormal during the second time period. At block 1106, the end node 902 determines whether the data is important, for example in this scenario whether the data is indicative of an urgent situation. If the room is an unoccupied office space, then an HVAC malfunction can be handled locally in due course, so the data is not treated as important and it is ignored and discarded at block 1108. On the other hand, if the room is a classroom, the end node identifies the pattern as important at block 1106, extracts temperature and location information, and maintenance contact information at block 1110, and then at block 1112 the end node 902 notifies the industry vertical node, i.e. school district maintenance in this case, where analytics at school district maintenance can receive the information and take action to address the problem.

Figure 12:
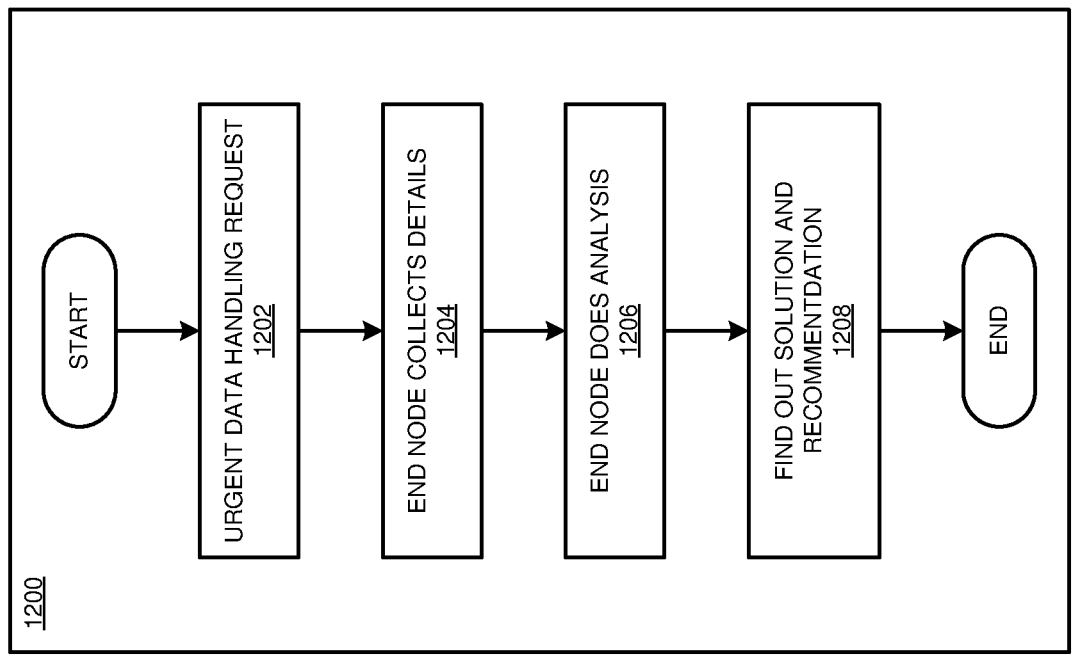
FIG. 12 depicts a flowchart of an example process for handling urgent data in accordance with an illustrative embodiment.

With reference to FIG. 12, this figure depicts a flowchart of an example process 1200 for handling urgent data in accordance with an illustrative embodiment. In an embodiment, the process 1200 applies to data received by the end node 902 that is recognized by the end node 902, for example because the end node determines that intelligence information stored at the end node from a previous analysis of other data applies equally to this data based on a data pattern, a metatag, or some other property of the data. There are many scenarios that require urgent data handling. As one non-limiting example, during a severe storm several weather sensors start creating message bursts that have the potential to overwhelm the network. In such a scenario, at block 1202, the weather vertical requests urgent data handling from the end node 902. Upon receipt of the request, the end node 902 begins collecting weather data and, at block 1206, begins analysis of the data, in this case by applying smart filters to discard irrelevant and redundant data to reduce the data load on the requesting network. At block 1208, the end node 902 returns the important data to the requesting network, so the requesting network can effectively proceed without the burden of being overloaded with unnecessary data. Since the end node 902 filters out unnecessary data, the load on the network is reduced and network outages due to overload can be avoided.

The process 1200 for handling urgent data can be similarly applied to many other use-cases from a wide variety of various industry vertical applications. For example, temperature sensor data that does not reflect anything unusual can be dropped if all sensors are reporting similar data; data from an ambulance that is responding to an emergency can be kept to allow for emergency services to handle the emergency situation; however ambulance data that is from an unoccupied ambulance that is not responding to an emergency can be dropped, especially if it is redundant to previously received data. Over time, machine learning techniques can be employed by the end node 902 to allow it to properly analyze and respond to data in increasingly complex scenarios with finer filtering abilities. For example, a network that is unable to scale and serve a complex transportation management scenario, e.g. traffic-jam, then it could become overloaded and begin to drop all or part of data to return to normal operation and lose important intelligence that may be retrieved in the data. But if the SRIF system is available, the network can offload the data to the end node 902, which can reduce the data load on the network by filtering out data that is not important on a permanent basis or for the duration of some event like the traffic jam. For example, while the traffic jam is being handled by emergency services, the end node 902 responds to a request for assistance with navigation data during the emergency, and responds by discarding navigation related data that is not needed by police for navigation and pass along navigation information that is needed by police and other first responders.

In an embodiment, the end node 902 uses machine learning techniques to make more complex decisions about data to keep and discard. For example, rather than keep all police related data during the traffic jam, the end node 902 considers more information about the police activity associated with the police navigation data, for example if the navigation data is for police vehicles responding to the traffic jam, it is important; if the navigation data is for a police van that is not responding to the traffic jam, but is responding to an emergency, it is still important; if the navigation data is for a police vehicle heading to a garage for maintenance, it is not important during the emergency period, so it can be dropped. While some of these situations may be handled directly by network nodes, the SRIF provides a beneficial alternative by preserving intelligence from data that is dropped and by providing the capability to perform extra analysis, including complex analytical capabilities that would adversely affect the latency of the access or core network.

Figure 13:
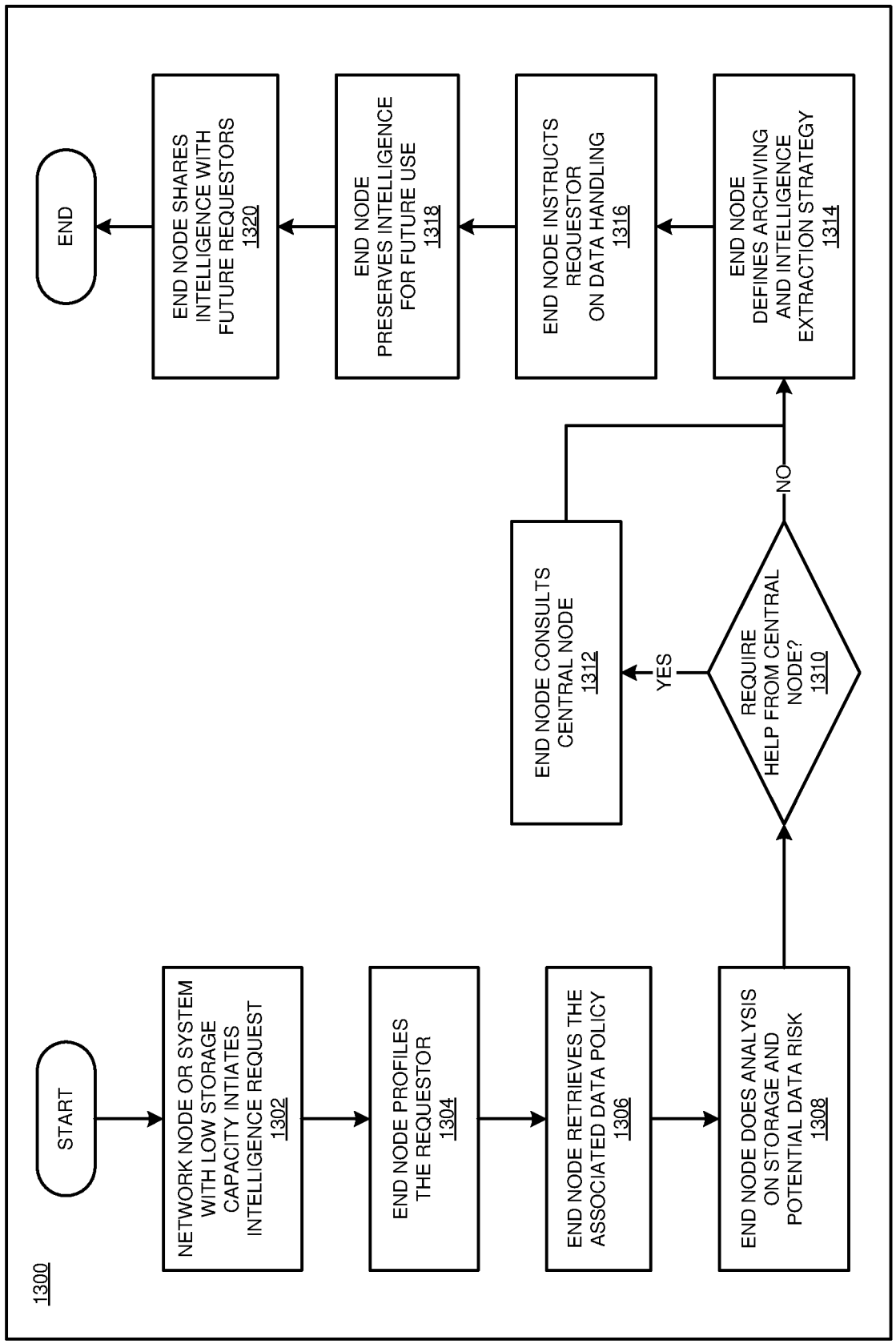
FIG. 13 depicts a flowchart of an example process for managing nodes at the edge and far ends of a network in accordance with an illustrative embodiment.

With reference to FIG. 13, this figure depicts a flowchart of an example process 1300 in accordance with an illustrative embodiment. In an embodiment, the network includes nodes at the edge and far ends of the network that have limited storage and processing capacity. These nodes work extremely fast and are lean in design. Therefore, other nodes handle complex analysis for such nodes and assist them with managing storage efficiently.

In an embodiment, at block 1302, a network node is running low on capacity, so rather than make decisions about data on its own, it sends a request for assistance to the end node 902. At block 1304, the evaluates the requesting node to determine the rule and policy for data archiving/deletion associated with the requesting node. In an embodiment, the end node 902 receives the associated policy from the requesting node at block 1306. At block 1308, the end node 902 performs an evaluation operation by processing data based on type of network or system and kind of data it stores. For example, an edge network element that has bursts of data from moving vehicles applies different rules depending on a multidimensional evaluation that can require a burdensome amount of processing that has the potential to increase latency. Therefore, rather than perform this processing, the edge network element will refer the processing to an end node 902 of an SRIF. The end node 902 will do analysis on data over multiple dimensions i.e. type of data, type of vehicle, security risk, potential intelligence in stored data and other operation parameters. At block 1310 and 1312, the end node 902 consults as needed with an upper node 904, such as a central node 302 (or any other central node discussed herein), for further intelligence or even pushes the intelligence to an upper node 904 that it can be shared with other nodes and industry vertical systems. At block 1314, the end node 902 begins processing the data, storing important data and discarding unimportant data. At block 1316, the end node 902 instructs the requesting node about how the data is being processed and stored. At block 1318, the end node 902 stores intelligence information about data being discarded, and at block 1320, the end node 902 shares the intelligence information with other nodes, if and when requests for such information arrive.

Future networks will have significant user data with privacy risks. Therefore, the end node 902 has unique processing rules for different entities, rather than universal rules that are applied to all data. In some embodiments, machine learning techniques can be used to improve the filtering abilities of the end nodes 902.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
receiving, by an end node, user plane and control plane mobile network data (received network data) from a mobile network;
performing, by the end node, an evaluation operation on the mobile network data, wherein the evaluation operation includes using a machine learning process to determine whether any portion of the received network data is unknown,
wherein the machine learning process results in a confidence value,
wherein the confidence value is in a first range of confidence values in a first case in which the received network data is a match to a known data pattern, and
wherein the confidence value is in a second range of confidence values in a second case in which the received network data is not a match to the known data pattern;
responsive to the evaluation operation, transmitting, by the end node to a central node via a middle layer node, a transmission of the at least a portion of the received network data, wherein the middle layer node comprises an interface that is accessible from the end node and from the central node for the transmission; and
receiving, by the end node, a rule set determined by the central node to be applicable to the at least a portion of the received network data based on a data processing operation performed by the central node on the at least a portion of the received network data.

2. The method of claim 1, where the central node, the end node, and the middle layer node are arranged in a hierarchy such that the end node is a lowest order node, the central node is a highest order node, and the middle layer node is hierarchically between the central node and the end node.

3. The method of claim 1, wherein the mobile network includes an access network, and further comprising providing, by the end node, the rule set received from the central node to at least one of the access network and another end node.

4. The method of claim 1, wherein the receiving, by the end node, of the rule set includes receiving, by the end node from the central node bypassing the middle node.

5. The method of claim 1, wherein the received network data processing operation of the central node includes at least one of:
developing a machine learning model for classifying received network data; and
using the machine learning model to classify the received network data.

6. The method of claim 1, wherein the rule set includes a rule related to at least one of a data retention policy, a disposal policy, and a privacy policy.

7. The method of claim 1, wherein the evaluation operation performed by the end node includes determining whether the at least a portion of the received network data includes exceptional data.

8. A computer implemented method comprising:
receiving, by a central node from an end node via a middle layer node, a transmission of at least a portion of mobile network data (received network data) transmitted to the end node from a user plane or a control plane of a mobile network,
wherein the middle layer node comprises an interface that is accessible from the central node and from the end node for the transmission, and
wherein the transmission of the at least a portion of the received network data is responsive to an evaluation operation on the received network data by the end node including determining whether any portion of the received network data is unknown;
performing, by the central node, a data processing operation on the at least a portion of the received network data using a machine learning model to determine a rule set applicable to the at least a portion of the received network data; and
transmitting, by the central node to the end node, the rule set determined to be applicable to the at least a portion of the received network data.

9. The method of claim 8, where the central node, the end node, and the middle layer node are arranged in a hierarchy such that the end node is the lowest order node, the central node is the highest order node, and the middle layer node is hierarchically between the central node and the end node.

10. The method of claim 8, wherein the mobile network includes an access network, and further comprising providing, by the end node, the rule set received from the central node to at least one of the access network and another end node.

11. The method of claim 8, wherein the transmitting, by the central node, of the rule set includes transmitting, by the central node to the end node bypassing the middle node.

12. The method of claim 8, wherein the data processing operation of the central node includes at least one of:
developing a machine learning model for classifying the received network data; and
using a machine learning model to classify the received network data.

13. The method of claim 8, wherein the rule set includes a rule related to at least one of a data retention policy, a disposal policy, and a privacy policy.

14. The method of claim 8, wherein the evaluation operation performed by the end node includes determining whether the at least a portion of the mobile network data includes exceptional data.

* * * * *